United States Patent [19]
Howard

[11] 3,895,521
[45] July 22, 1975

[54] G-LOAD MEASURING AND INDICATOR APPARATUS

[75] Inventor: James C. Howard, Sunnyvale, Calif.

[73] Assignee: The United States Government as represented by the National Aeronautics and Space Administration Office of General Counsel-Code GP, Washington, D.C.

[22] Filed: June 12, 1974

[21] Appl. No.: 478,802

[52] U.S. Cl. .............................................. 73/178 R
[51] Int. Cl. ............................................. G01p 5/00
[58] Field of Search ............. 73/178 R, 178 H, 181; 244/77 D, 77 S, 77 G; 340/27 SS, 27 NA

[56] References Cited
FOREIGN PATENTS OR APPLICATIONS
153,479    5/1959    Australia ........................... 73/178 R

*Primary Examiner*—Donald O. Woodiel
*Attorney, Agent, or Firm*—Darrell G. Brekke; Armand G. Morin, Sr.; John R. Manning

[57] ABSTRACT

A $g$-load measuring apparatus for facilitating pilot control of $g$-load during maneuvering and to provide an indication of $g$-load constraint violations. The apparatus includes processing means for receiving the components of the linear acceleration and angular velocity of the aircraft and for generating the first output signal indicative of the critical velocity of the aircraft and a second output signal indicative of the instantaneous maneuvering velocity of the aircraft. Indicating means is connected to the processing means for receiving the two output generated signals such that the relative magnitude of the two signals are compared to provide an indication of the relative freedom of maneuverability of the aircraft and/or any $g$-load constraint violation that might exist.

19 Claims, 5 Drawing Figures

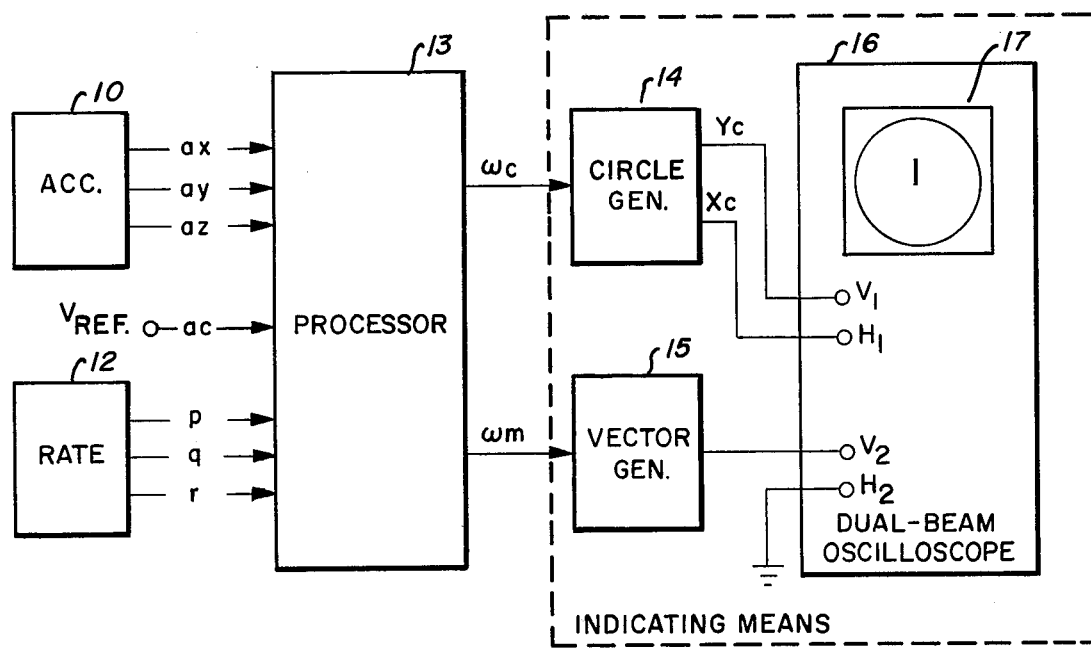
Fig_1
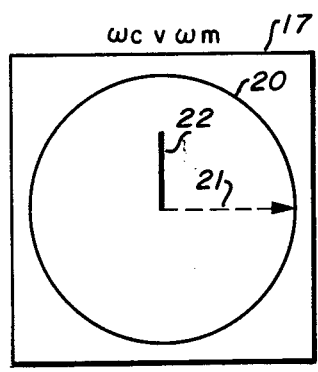
Fig_2
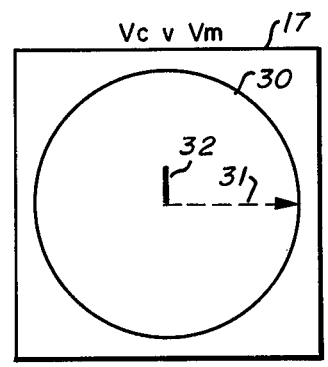
Fig_3

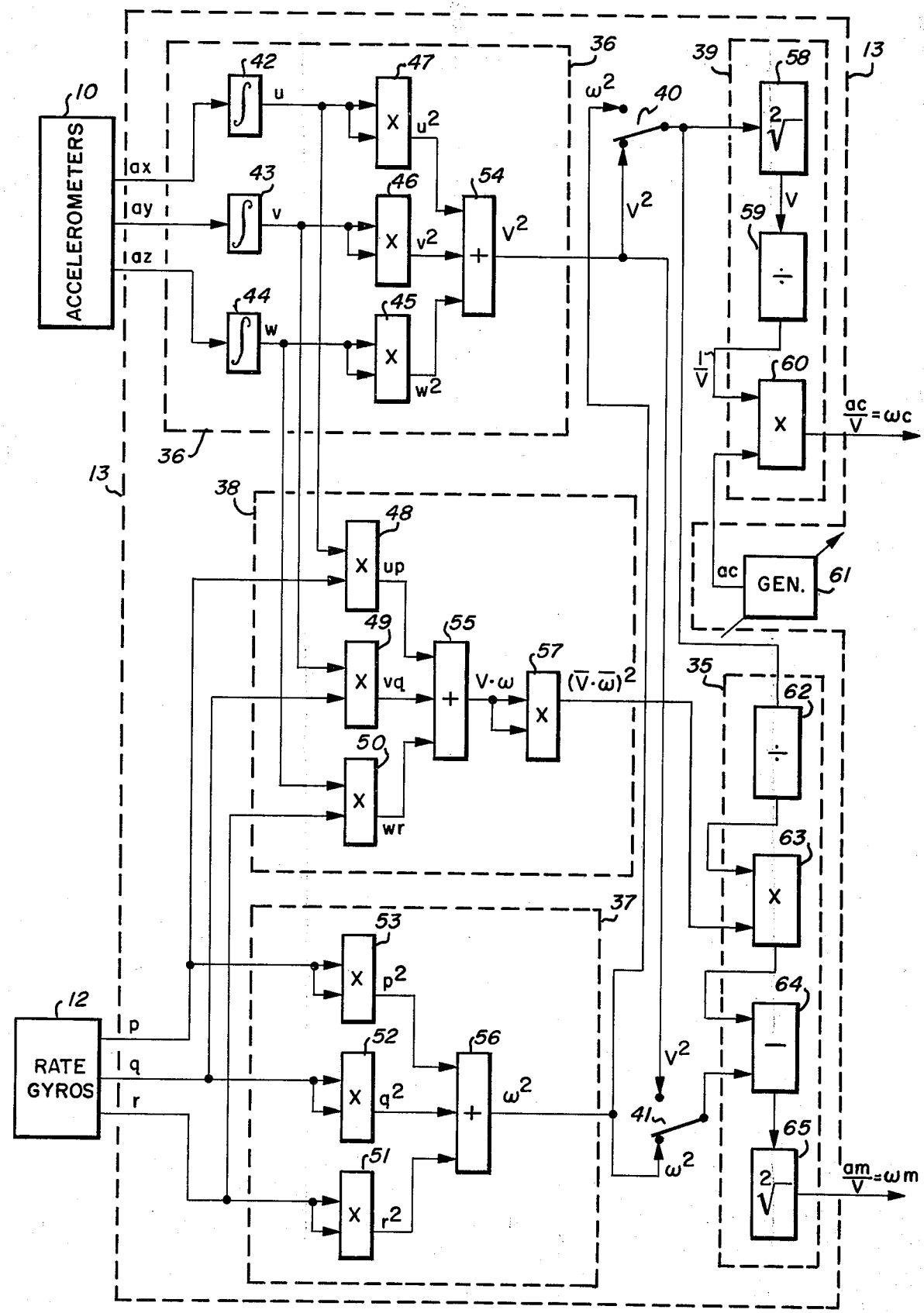
Fig_4

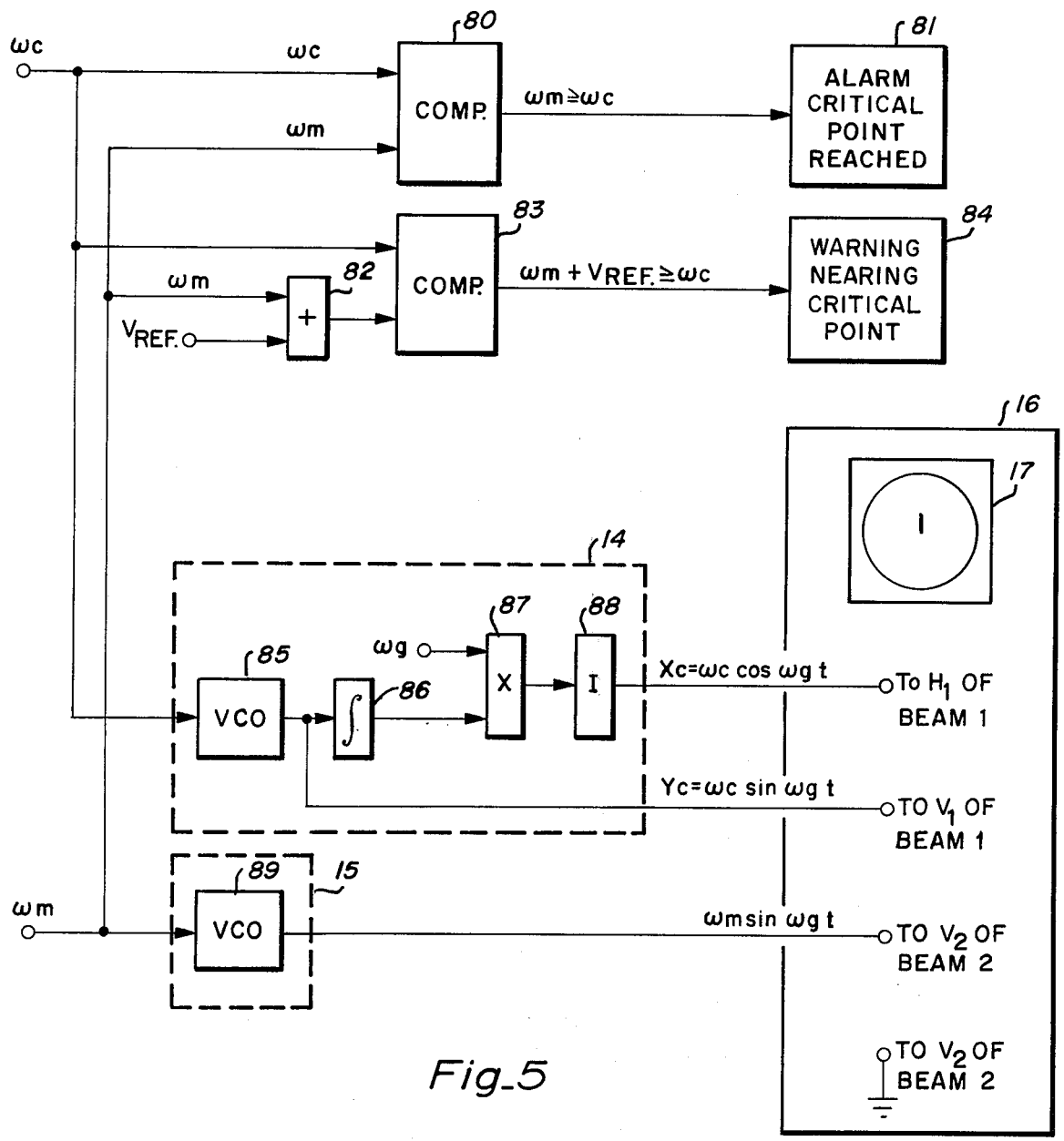
Fig_5

G-LOAD MEASURING AND INDICATOR APPARATUS

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates generally to apparatus for measuring and indicating the g-load effect on a maneuvering aircraft and more specifically, to apparatus for measuring and indicating the relative magnitude of the instantaneous critical velocity and the instantaneous maneuvering velocity of a maneuvering aircraft.

2. Description of the Prior Art

Although there are many critical loads that must not be exceeded on an aircraft, at present no attempt is made to measure all of these loads during flight. The typical aircraft g-indicator is a very simple instrument that can only measure acceleration along a single axis (usually the "vertical" axis normal to the path of flight). In a piloted aircraft, the pilot is subject to the same acceleration loads as the aircraft, and he automatically attempts to regulate them. However, in a remotely-piloted vehicle, the remote pilot is unable to sense the acceleration loads being experienced by the aircraft, and can inadvertently cause the aircraft to exceed its g-load limits thereby causing severe damage and even destruction of the airframe.

SUMMARY OF THE PRESENT INVENTION

It is therefore an object of this invention to provide a g-load measuring apparatus.

It is another object of this invention to provide measuring apparatus for measuring the instantaneous critical velocity and the instantaneous maneuvering velocity of a maneuvering aircraft.

It is still another object of the invention to provide new measuring apparatus for providing a visual indication of the relative magnitude of the instantaneous values of the critical velocity and the maneuvering velocity of an aircraft so as to provide an indication as to the maneuverability allowed for the aircraft and the presence of any unsafe condition due to the maneuvering velocity exceeding the critical velocity.

Briefly, in accordance with the present invention, accelerometers are used to provide the instantaneous values of the three orthogonal components of linear acceleration being experienced by the aircraft at any given time and rate gyros are used to provide indications of the instantaneous values of the components of angular velocity being experienced by the aircraft at any instant of time. In addition, an input signal indicative of the design maximum critical acceleration for the aircraft being maneuvered is also generated. A processor unit receives the three components of the linear acceleration, the three components of the angular velocity and the design critical acceleration signal, and generates a first output signal which is indicative of the instantaneous critical angular or linear velocity of the aircraft and a second signal which is indicative of the instantaneous maneuvering angular or linear velocity of the aircraft. The two output signals are then fed into an indicating means which displays to the pilot, either within the aircraft or remotely located, the relative magnitudes of these two signals such that the pilot may be made aware of his degree of freedom to further maneuver the aircraft and may determine when the aircraft approaches or exceeds the critical design acceleration constraints placed on the aircraft.

One advantage of this invention is that it provides a facility to the pilot for controling a g-loading maneuver and provides an immediate indication of g-load constraint violations.

Another advantage of the invention is that it allows the pilot to treat the cause of maneuvering acceleration, that is, the angular and linear velocities of the aircraft. Displaying the relationship between the instantaneous critical velocity and maneuvering velocity to the pilot allows him to immediately ascertain the cause or causes of the induced acceleration and to choose either or both of two alternative corrections, that is to either control the linear or angular velocity of the aircraft.

A still further advantage of the present invention is to provide a remote pilot with information which allows him to ascertain the instantaneous effects of the g-loading upon a maneuvering aircraft which he is piloting.

The foregoing and other objects, features and advantages of the invention will be apparent from the following description of the preferred embodiment of the invention as illustrated in the accompanying drawings.

IN THE DRAWINGS

FIG. 1 shows a logic diagram of the major components of a g-load measuring apparatus in accordance with the present invention;

FIG. 2 shows the display of the dual-beam oscilloscope illustrated in FIG. 1 displaying the critical angular velocity as a circle and the maneuvering angular velocity as a straight line;

FIG. 3 shows the display of the dual-beam oscilloscope illustrated in FIG. 1 wherein the display shows the critical linear velocity as a circle and the maneuvering linear velocity as a straight line;

FIG. 4 is a logic diagram illustrating the principal components of the processor of FIG. 1;

FIG. 5 is a logic diagram illustrating the principal indicating means of the processor shown in FIG. 1, and more specifically showing the logic necessary to generate the display shown in FIGS. 2 and 3.

DETAILED DESCRIPTION OF THE PREFERRED EMBODIMENT

In order to better understand the discussion of the preferred embodiments, Table I defines the meaning of the symbols that will be used throughout the remaining portion of the discussion.

TABLE I

| | |
|---|---|
| $a_x$ | linear acceleration with respect to roll axis; |
| $a_y$ | linear acceleration with respect to pitch axis; |
| $a_z$ | linear acceleration with respect to yaw axis; |
| u | linear velocity component with respect to roll axis; |
| v | linear velocity component with respect to pitch axis; |
| w | linear velocity component with respect to yaw axis; |
| p | angular velocity about the roll axis; |
| g | angluar velocity about the pitch axis; |
| r | angular velocity about the yaw axis; |
| ωg | arbitrary radian per second; |

TABLE I-Continued

| | |
|---|---|
| ac | critical (max.) acceleration; |
| am | maneuvering acceleration; |
| V | resultant linear velocity; |
| ω | resultant angular velocity; |
| ωc | critical angular velocity; |
| ωm | measured angular velocity; |
| Vc | critical linear velocity; |
| Vm | measured linear velocity. |

FIG. 1 shows a block diagram of the measuring apparatus of the invention wherein accelerometers 10 provide three signals whose values are equal to the instantaneous values of the three components of the linear acceleration of the aircraft, $ax$, $ay$ and $az$. Rate gyros 12 provide three signals indicative of the three components of the instantaneous angular velocity, $p$, $q$ and $r$, of the aircraft. Also provided is an input signal $ac$ which is indicative of the maximum design critical acceleration of the aircraft in which the instrument is placed. Processor 13 receives the three acceleration components from accelerometers 10, the three angular component signals from rate gyros 12 and input signal $ac$, the critical acceleration for the aircraft. Processor 13 processes the instantaneous information and generates a first output signal indicative of the instantaneous critical angular velocity $\omega c$ of the aircraft and a second output signal $\omega m$ indicative of the instantaneous maneuvering angular velocity of the aircraft. Circle generator 14 receives the first signal from processor 13 and generates output signals $yc$ and $xc$ for controling one beam of a dual-beam oscilloscope 16. Output signals $yc$ and $xc$ are such as to generate a circle display on CRT 17 of dual-beam oscilloscope 16 where the radius of a circle generated is a function of the first signal, that is the instantaneous critical velocity signal $\omega c$. Vector generator 15 receives the second output signal from processor 13 and generates a signal for controling the second beam of dual-beam oscilloscope 16 for displaying a vector on CRT 17 of dual-beam oscilloscope 16. A magnitude of the vector generated by vector generator 15 is a function of the magnitude of the second signal received from processor 13, that is the instantaneous maneuvering angular velocity $\omega m$.

In the case of a maneuvering aircraft, it has been found that for a given critical acceleration $ac$ that the angular critical velocity vector $\bar{\omega}c$ is bounded by the surface of a circular cylinder of radius $ac/V$ and that the linear critical velocity vector $\bar{V}c$ is bounded by the surface of a circular cylinder of radius $ac/\omega$.
Thus $$\omega c = \frac{ac}{V}, \quad (1)$$

and $$Vc = \frac{ac}{\omega} \quad (2)$$

By analogy it can be shown that the instantaneous values for the maneuvering angular velocity vector $\omega m$ and the maneuvering linear velocity vector $vm$ are $$\omega m = \frac{am}{v} \quad (3)$$

and $$Vm = \frac{am}{\omega} \quad (4)$$

The measuring device herein described is capable of displaying the relationship between either the instantaneous critical angular velocity $\omega c$ and the instantaneous maneuvering angular velocity $\omega m$ or the relationship between the instantaneous critical linear velocity $Vc$ and the instantaneous maneuvering linear velocity $Vm$. FIG. 2 shows the resultant display that would appear on the CRT 17 of oscilloscope 16 of FIG. 1 where the relationship is between the instantaneous critical angular velocity $\omega c$ and the instantaneous maneuvering angular velocity $\omega m$. A circle display is generated to indicate the magnitude of the instantaneous critical angular velocity $\omega c$. The radius of the circle from the center of the circle is controlled by the value generated for the instantaneous critical angular velocity. The radius of the circle is inversely proportional to the resultant velocity $V$ of the aircraft, that is the slower the resulting velocity of the aircraft the greater the radius of the circle.

FIG. 3 shows the relationship between the instantaneous critical linear velocity $Vc$, as a circle, and the instantaneous maneuvering linear velocity $Vm$, as a vector, as it would appear on CRT 17 of dual-beam oscilloscope 16, FIG. 1.

If two dual-beam oscilloscopes are available then both of these presentations can be made at the same time. In this case, it should be noted that for the same set of input values to the processor that the resulting circles representing the two critical velocities can be of different sizes, as can the magnitude representing the two maneuvering velocities. FIGS. 2 and 3 show, by way of example, the radius of the critical linear velocity circle is greater than that of the critical angular velocity and that the magnitude of the maneuvering linear velocity vector of FIG. 3 is less than the magnitude of the maneuvering angular velocity of FIG. 2. Further, there exists an inter-relationship between the critical angular velocity, the critical linear velocity, the maneuvering angular velocity and the maneuvering linear velocity.

With reference to FIG. 4, there is shown a logic diagram for the processor 13 of FIG. 1. It is desired to either generate values $\omega c$ and $\omega m$ or $Vc$ and $Vm$ as represented by equations (1) through (4).

Maneuvering acceleration resulting from changes in aircraft attitude can be defined in scalar form as $$am^2 = V^2\omega^2 - (\bar{V} \cdot \bar{\omega})^2 \quad (5)$$

In terms of the linear and angular velocity components, equation (5) may be expanded as follows $$a^2m = (v^2 + w^2)p^2 + (u^2 + w^2)q^2 + (u^2 + v^2)r^2 - 2(uvpq + uwpr + vwqr) \quad (6)$$

It is possible to obtain values for the linear velocity components $u$, $v$ and $w$ from processing the linear acceleration components $ax$, $ay$ and $az$ and for the angular velocity component $p$, $q$ and $r$ from the rate gyros for the maneuvering aircraft.

It can be shown that $$V^2 = u^2 + v^2 + w^2 \tag{7}$$

and $$\omega^2 = p^2 + q^2 + r^2 \tag{8}$$

In order to obtain equation (3) from the available velocity components, equation (3) is squared to yield $$\omega m^2 = \frac{am^2}{V^2} \tag{9}$$

Substituting (5) with (9) and simplifying $$\omega m^2 = \frac{V^2 (p^2 + q^2 + r^2) - (pu + qv + rw)^2}{V^2} \tag{10}$$

Further simplification of (10)

$$\omega m^2 = (p^2 + q^2 + r^2) - \frac{(pu + qv + rw)^2}{V^2} \tag{11}$$

In a similar manner the square of equation (4) can be obtained from $$Vm^2 = (U^2 + v^2 + \omega^2 - \frac{(pu + qv + rw)^2}{\omega^2} \tag{12}$$

Specifically, processor 14 is an analogue processor, and the circuits used therein are well known in the art and can readily be found in, by way of example, such texts as *Analogue Computation* by Albert S. Jackson, McGraw-Hill Book Company, 1960.

Returning to FIG. 4, the processor 13 generates values for the resulting linear velocity V and the resultant angular velocity $\omega$.

Processor 13 has a first means 36 for generating an output signal $V^2$ whose value is the square of the resultant linear velocity V. The three acceleration components $ax$, $ay$ and $az$ from accelerometers 10 are integrated by means of integrators 42, 43 and 44 to generate linear velocity signals $u$, $v$ and $w$. Each linear velocity component is then squared by means of multipliers 45, 46 and 47 to generate the square of each of the velocity components $u^2$, $v^2$ and $w^2$. The three squared component signals from multipliers 45, 46 and 47 is inputed to adder circuitry 54 which generates an output signal $V^2$ whose value is the square of the resultant linear velocity.

Processor 13 has a second means 37 for generating an output signal $\omega^2$ whose value is the square of the resultant angular velocity $\omega$. The three component angular velocity signals p, q and r from rate gyro 12 are each connected to multipliers 53, 52 and 51, respectively, to generate the square value $r^2$, $q^2$ and $p^2$. The output from multiplier 51, 52 and 53 are inputed into adder circuit 56 which combines the signals representing $r^2$, $q^2$ and $p^2$ to generate an output signal $\omega^2$ whose value is the square of the resultant angular velocity of the aircraft.

Processor 13 has a third means 38 for generating an ouput signal $(\bar{V} \cdot \bar{\omega})^2$ whose value is the square of the dot product of the linear and angular velocities. The dot product of the linear velocity component $u$, $v$ and $w$, and the angular velocity components $p$, $q$ and $r$ is obtained by means multipliers 48, 49 and 50. Multiplier 48 multiplies the components $u$ and $p$, multiplier 49 multiplies the components $v$ and $q$, and multiplier 50 multiplies the components $r$ and $w$. The output of multipliers 48, 49 and 50 are inputed to adder 55 to generate a summation signal. The output of adder 55 is fed into multiplier 57 to generate the square of the dot product $(\bar{V} \cdot \bar{\omega})^2$ of the angular and linear velocity of the aircraft.

Switches 40 and 41 are shown so as to control which of the two possible comparisons for display will be processed. It should be herein noted that the logic shown to the right of switches 40 and 41 could be duplicated as a separate channel. In this case one channel would be connected to the switch position now shown for switches 40 and 41, and the second channel would be connected to the open set of contacts of switches 40 and 41. This would provide output signals capable of displaying both the linear and angular velocity signals as shown in FIGS. 2 and 3 simultaneously.

However, it is not necessary to display both of these simultaneously due to the inter-relationship of the components. In order to describe the system with the least complexity, the logic of one channel is shown with switches 40 and 41. Switches 40 and 41 are ganged and are in the position so as to provide the display as shown in FIG. 2.

Processor 13 will generate the instantaneous critical angular velocity $\omega c$ and the instantaneous maneuvering angular velocity $\omega m$.

Referring to equation (1) and (3), it can be seen that the critical angular velocity $\omega c$ can be obtained by obtaining the ratio of the critical designed acceleration ac and the resultant velocity V. Processor 13 has a fourth means 39 for generating the desired critical velocity signal ($Vc$ or $\omega c$). Switch 40 therefore passes the square of resultant velocity $V^2$ into square root circuit 58 to produce resultant velocity V. Resultant velocity signal V is inputed to a divider circuitry 59 which takes the inverse of the input signal and generates an output signal equal to 1/V. Multiplier 60 multiplies 1/V with the value inputed equal to the critical design acceleration ac. Generator 61 is a voltage generator capable of generating a signal whose magnitude is indicative of the design value of the maximum critical acceleration to be associated with the aircraft. The output of multiplier 60 is therefore the instantaneous critical angular acceleration $\omega c$ as stated in equation (1).

Processor 13 finally has a fifth means 35 for generating an output signal whose value is the maneuvering velocity ($Vm$ or $\omega m$). As previously shown, the square of the maneuvering angular velocity $\omega m^2$ can be obtained from the equation (11). Therefore, switch 40 feeds the square of the resultant velocity $V^2$ through divider circuitry 62 which takes the inverse and produces an output signal equal to $1/V^2$. The output from divider circuitry 62 is fed into multiplier 61 which multiplies $1/V^2$ by the square of the dot product from multiplier 57 generating the second term on the right-hand side of equation (11).

By comparing equation (8) with equation (11) it can be realized that the first term of the right-hand side of equation (11) can be obtained from the output of adder circuitry 56, the square of the resultant angular velocity $\omega^2$. The output of adder circuitry 56 is fed into the subtractor circuitry 64 which subtracts the output of multiplier 63 from the values of adder circuitry 56. The resulting outputs of subtractor 64 is the square of the instantaneous maneuvering angular velocity $\omega m$. The output of subtractor 64 is passed through square root circuit 65 to generate an output signal whose value is indicative of the instantaneous maneuvering angular velocity of the aircraft.

It should be realized that if switch 40 and 41 were shown in the opposite positions, then the output of multiplier 60 would have been the critical linear velocity, and the output of square root circuit 65 would have been the instantaneous maneuvering linear velocity $Vm$.

The indicating means of the invention is shown in FIG. 5. FIG. 5 shows the circuitry necessary to generate the circle display and the vector display of FIGS. 2 and 3, and also shows alternative warning devices which might be used with this device.

The circle display is generated by connecting the critical velocity, whether it be the angular velocity or the linear velocity signal, to a voltage control oscillator 85 where the amplitude of the oscillations is controlled as a function of the magnitude of the incoming signal. The output of oscillator 85 is signal $Yc$ which is a sine wave of frequency $\omega g$, where $\omega g$ is an arbitrary value sufficient such that the oscilloscope will present a continuous circular display. The output of oscillator 85 is fed into integrator 86 to produce the cosine function of the sine wave being generated by oscillator 85. Multiplier 87 is connected to the output of integrator 86 to provide a scaling function such that the resulting output sine wave's amplitude is only a function of the amplitude of the output of oscillator 85.

Finally, it is necessary to pass the output of multiplier 87 through inverter 88 to correct the sign reversal introduced during integration by integrator 86. The output of inverter 88 is signal $Xc$. If signal $Xc$ is applied to the horizontal control of beam 1 of oscilloscope 16 of FIG. 1, and signal $Yc$ is applied to the vertical control of beam 1 of oscilloscope 16 of FIG. 1, there will be caused a circle to be displayed on the CRT 17 of the oscilloscope 16. It can readily be realized that since the magnitude of the sine wave causing the generation of the display is a direct function of the magnitude of the critical angular velocity controlling oscillator 85 that the radius of the resulting signal is also a function of the critical angular velocity $\omega c$ being inputed to oscillator 85.

The instantaneous maneuvering angular acceleration $\omega m$ is inputed to another voltage control oscillator 89 whose frequency is the same as voltage control oscillator 85. Here again voltage control oscillator 89 has the magnitude of its output signal controlled by the value of the signal being inputed to it. The output of oscillator 89 is therefore a sinusoid whose amplitude is a direction function of the instantaneous maneuvering angular velocity inputed to oscillator 89. The output of oscillator 89 is fed to the vertical control of the second beam of oscilloscope 16. The horizontal control of the second beam of oscillator 16 is grounded. This combination causes a straight line vector to be generated whose magnitude is equal to the amplitude of the sinusoid generated by oscillator 89. The starting point of the vector being generated by oscillator 89 is placed at the center of the circle being generated by oscillator 85.

Therefore, if the straight line vector should touch or exceed the circle being displayed, then the maneuvering velocity would equal or exceed the critical velocity at that instant in time. Further, if the line vector is within the circle as defined by oscillator 85, then the aircraft is within its design limitations as to its $g$-loads.

As a further warning to the pilot of the aircraft, an analogue comparison can be made between the instantaneous values of the critical and maneuvering angular velocities by comparitor 80. Comparitor 80 activates an alarm 81, a buzzer or a flashing light, whenever the two input signals are equal or when the maneuvering velocity is greater than the defined critical velocity at any instant of time. If it is desired to warn the pilot that the maneuvering velocity is becoming within a fixed distance of the critical velocity, comparitor 83 can be used to compare the critical velocity with the maneuvering velocity plus an off-set reference voltage generated by ad circuitry 82 and will activate an alarm 84 whenever the maneuvering velocity plus the reference voltage is equal to or greater than the critical velocity, thereby warning the pilot.

This invention has been shown to exist entirely within the confines of the aircraft that is being maneuvered. A direct connection is made between the output of rate gyros 12 and accelerometers 10 to the measuring device. It should be realized that telemetry can be used to send these values to a remote station and that the measuring device could be located and operated at a remote location. Further, it is possible to have the processor portion of the invention located aboard the aircraft and by use of telemetry send the critical velocity and maneuvering signals to the indicator device at the remote station.

In that analog computations are used, the values shown are instantaneous values and will instantaneously reflect any actions taken by the pilot while maneuvering the aircraft. The indicating device will display the instantaneous changes and allow the pilot a means whereby he can have a visual indication of the relationships between the critical velocity for the aircraft and the instantaneous velocity that the aircraft is being subjected to. In order to maintain the aircraft in a safe condition, the pilot would therefore always try to maneuver the aircraft such that the line vector is within the circle being generated on CRT 17 of oscilloscope 16.

While the invention has been particularly shown and described with reference to a generalized preferred embodiment thereof, it will be understood by those skilled in the art that various changes in the arrangement of circuitry, in form and in detail may be made therein without departing from the spirit and scope of the invention.

What is claimed is:

1. A $g$-load measuring apparatus for indicating the instantaneous relationship between instantaneous critical velocity and instantaneous maneuvering velocity of an aircraft being maneuvered, comprising:

signal generating means for developing linear acceleration signals respectively corresponding to the three orthogonal components, $ax$, $ay$ and $az$, of the instantaneous linear acceleration of the aircraft;

signal generating means for developing angular velocity signals respectively corresponding to the three orthogonal components, $p$, $q$ and $r$, of the instantaneous angular velocity of the aircraft;

signal generating means for developing a reference signal representing the design maximum critical acceleration ac for said aircraft;

processor means for receiving and processing said linear acceleration, angular velocity and reference signals to generate a first signal indicative of the instantaneous critical velocity of the aircraft and a second signal indicative of the instantaneous maneuvering velocity of the aircraft; and indicating means responsive to said first and second signals and operative to indicate the relationship of the instantaneous values of the critical velocity and the maneuvering velocity of the aircraft.

2. A $g$-load measuring apparatus as recited in claim 1 wherein said indicating means includes
display means for visually displaying said instantaneous critical velocity and said instantaneous maneuvering velocity simultaneously.

3. A $g$-load measuring apparatus as recited in claim 2 wherein said indicating means further comprises
circle means for generating signals for input to said display means to cause a circle to be displayed on said display means, the radius of said circle being a function of said first signal and indicative of said instantaneous critical velocity.

4. A $g$-load measuring apparatus as recited in claim 3 wherein said indicating means further comprises:
vector means for generating a signal for input to said display means to cause a line to be displayed on said display means, the length of said line being a function of said second signal and indicative of said instantaneous maneuvering velocity.

5. A $g$-load measuring apparatus as recited in claim 4 wherein said vector means further causes said line to begin at the center of said circle and extend radially outwardly therefrom.

6. A $g$-load measuring apparatus as recited in claim 2 wherein said indicating means further comprises
vector means for generating a signal for input to said display means to cause a line to be displayed on said display means, the length of said line being a function of said second signal and indicative of said instantaneous maneuvering velocity.

7. A $g$-load measuring apparatus as recited in claim 1 wherein said processor means is comprised of
a first means responsive to said linear acceleration signals and operative to generate a third signal indicative of the square of the instantaneous resultant linear velocity, $V^2$;
a second means responsive to said angular velocity signals and operative to generate a fourth signal indicative of the square of the instantaneous resultant angular velocity, $\omega^2$; and
a third means responsive to said linear accelerator signals and said angular velocity signals and operative to generate a fifth signal indicative of the dot product of the component of the linear velocity and the angular velocity.

8. A $g$-load measuring apparatus as recited in claim 7 wherein said processor further comprises
a fourth means responsive to said third signal, $V^2$, and said design critical acceleration signal, ac, and operative to generate a sixth signal indicative of the present instantaneous critical angular velocity, $\omega c$; and
a fifth means responsive to said third signal, $V^2$, said fourth signal, $\omega^2$, and said fifth signal, $(V\omega)^2$, and operative to generate a seventh signal indicative of the instantaneous angular maneuvering velocity, $\omega m$.

9. A $g$-load measuring apparatus as recited in claim 7 wherein said processor further comprises
a fourth means responsive to said fourth signal, $\omega^2$, and said design critical acceleration signal, ac, and operative to generate a sixth signal indicative of the instantaneous critical linear velocity, $Vc$; and
a fifth means responsive to said third signal, $V^2$, said fourth signal, $\omega^2$, and said fifth signal, $(\overline{V\cdot\omega})^2$, and operative to generate a seventh signal indicative of the instantaneous linear maneuvering velocity, $Vm$.

10. A $g$-load measuring apparatus as recited in claim 8 wherein said indicating means includes
display means for displaying said instantaneous critical angular velocity, $\omega c$, and said instantaneous maneuvering angular velocity, $\omega m$, simultaneously.

11. A $g$-load measuring apparatus as recited in claim 10 wherein said indicating means further comprises:
circle means for generating signals for input to said display means to cause a circle to be displayed on said display means, the radius of said circle being a function of said sixth signal and indicative of the instantaneous critical angular velocity, $\omega c$.

12. A $g$-load measuring apparatus as recited in claim 11 wherein said indicating means further comprises
vector means for generating a signal for input to said display means to cause a line to be displayed on said display means, the length of said line being a function of the said seventh signal and indicative of the instantaneous maneuvering angular velocity, $\omega m$.

13. A $g$-load measuring apparatus as recited in claim 12 wherein said tenth means further causes said line to begin at the center of the circle generated by said ninth means and extend radially outwardly therefrom.

14. A $g$-load measuring apparatus as recited in claim 10 wherein said indicating means further comprises
vector means for generating a signal for input to said display means to cause a line to be displayed on said display means, the length of said line being a function of said seventh signal and indicative of the instantaneous maneuvering angular velocity, $\omega m$.

15. A $g$-load measuring apparatus as recited in claim 9 wherein said indicating means includes
display means for displaying said instantaneous critical linear velocity, $Vc$, and said instantaneous maneuvering linear velocity, $Vm$, simultaneously.

16. A $g$-load measuring apparatus as recited in claim 15 wherein said indicating means further comprises
circle means for generating signals for input to said display means to cause a circle to be displayed on said display means, the radius of said circle being a function of said sixth signal and indicative of the instantaneous critical linear velocity. $Vc$.

17. A $g$-load measuring apparatus as recited in claim 16 wherein said indicating means further comprises
vector means for generating a signal for input to said display means to cause a line to be displayed on said display means, the length of said line being a function of said seventh signal and indicative of the instantaneous maneuvering linear velocity, $Vm$.

18. A $g$-load measuring apparatus as recited in claim 17 wherein said vector means further causes said line to begin at the center of said circle.

19. A *g*-load measuring apparatus as recited in claim 15 wherein said indicating means further comprises vector means for generating a signal for input to said display means to cause a line to be displayed on said display means, the length of said line being a function of said seventh signal and indicative of the instantaneous maneuvering linear velocity, V*m*.

* * * * *